(12) United States Patent
Tian et al.

(10) Patent No.: US 10,516,640 B2
(45) Date of Patent: Dec. 24, 2019

(54) GROUP MESSAGE UPDATING AND DISPLAYING METHOD, APPARATUS, AND TERMINAL

(71) Applicant: TENCENT TECHNOLOGY (SHENZHEN) COMPANY LIMITED, Shenzhen (CN)

(72) Inventors: Yuan Tian, Shenzhen (CN); Lin Li, Shenzhen (CN); Feng Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 160 days.

(21) Appl. No.: 15/693,415

(22) Filed: Aug. 31, 2017

(65) Prior Publication Data

US 2017/0366495 A1  Dec. 21, 2017

Related U.S. Application Data (63) Continuation of application No. PCT/CN2016/082232, filed on May 16, 2016.

(30) Foreign Application Priority Data

Jul. 15, 2015  (CN) .......................... 2015 1 0417174

(51) Int. Cl.
*H04L 12/58* (2006.01)
*G06F 3/0482* (2013.01)

(52) U.S. Cl.
CPC .............. *H04L 51/22* (2013.01); *H04L 51/24* (2013.01); *G06F 3/0482* (2013.01)

(58) Field of Classification Search
CPC ........ G06F 3/0482; H04L 51/22; H04L 51/24
See application file for complete search history.

(56) References Cited

U.S. PATENT DOCUMENTS 8,312,096 B2 *  11/2012  Cohen ..................... H04L 51/24
                                                                                        709/207
8,331,912 B1 *  12/2012  Lundy ................. H04L 67/1095
                                                                                        455/414.1

(Continued)

FOREIGN PATENT DOCUMENTS

CN      101115242 A      1/2008
CN      101931931 A      12/2010

(Continued)

OTHER PUBLICATIONS

Korean Intellectual Property Office (KIPO) Office Action 1 for 10-2017-7036769 dated Aug. 21, 2018 10 Pages (including translation).

(Continued)

*Primary Examiner* — Mohamed A. Wasel
(74) *Attorney, Agent, or Firm* — Anova Law Group, PLLC (57) ABSTRACT

A message update method includes: displaying a group message reminding identifier on a session entry of a specified group on a session list interface when it is detected that a message in the specified group is updated. The updated message of the specified group is obtained from a server when it is detected that an operation on either of the group message reminding identifier and the specified group meets a message update condition. The number of updated messages of the specified group on the session entry is displayed when it is detected that the operation on either of the group message reminding identifier and the specified group does not meet the message update condition.

12 Claims, 3 Drawing Sheets

(56) References Cited

U.S. PATENT DOCUMENTS

| | | | | |
|---|---|---|---|---|
| 9,342,612 | B2* | 5/2016 | Kao | G06Q 50/01 |
| 10,033,679 | B2* | 7/2018 | Gilad | H04L 51/22 |
| 2007/0130626 | A1* | 6/2007 | Kato | G06F 8/61 |
| | | | | 726/27 |
| 2012/0149342 | A1* | 6/2012 | Cohen | H04L 51/24 |
| | | | | 455/412.2 |
| 2013/0159314 | A1* | 6/2013 | Kao | G06Q 50/01 |
| | | | | 707/740 |
| 2014/0337752 | A1* | 11/2014 | Cammarata | H04M 1/72563 |
| | | | | 715/744 |
| 2018/0270183 | A1* | 9/2018 | Wei | H04L 51/046 |
| 2018/0373405 | A1* | 12/2018 | Donahue | G06F 3/0484 |

FOREIGN PATENT DOCUMENTS

| | | |
|---|---|---|
| CN | 101282312 B | 2/2011 |
| CN | 102263852 A | 11/2011 |
| CN | 102638358 A | 8/2012 |
| CN | 103051516 A | 4/2013 |
| CN | 103368828 A | 10/2013 |
| CN | 103518350 A | 1/2014 |
| CN | 105119806 A | 12/2015 |
| JP | 2002183021 A | 6/2002 |
| JP | 2002215543 A | 8/2002 |
| JP | 2007102352 A | 4/2007 |
| JP | 2009070395 A | 4/2009 |
| JP | 2010015417 A | 1/2010 |

OTHER PUBLICATIONS

The World Intellectual Property Organization (WIPO) International Search Report for PCT/CN2016/082232 dated Jul. 26, 2016 6 Pages.

The State Intellectual Property Office of the People's Republic of China (SIPO) Office Action 1 for 201510417174.2 dated Jun. 7, 2016 7 Pages.

The Japan Patent Office (JPO), Office Action for Application No. 2017-555640, dated Nov. 5, 2018, 4 Pages (including translation).

* cited by examiner

GROUP MESSAGE UPDATING AND DISPLAYING METHOD, APPARATUS, AND TERMINAL

RELATED APPLICATION

This application is a continuation application of PCT Patent Application No. PCT/CN2016/082232, filed on May 16, 2016, which claims priority to Chinese Patent Application No. 201510417174.2, filed with the Chinese Patent Office on Jul. 15, 2015 and entitled "MESSAGE UPDATING METHOD, APPARATUS, AND TERMINAL", the entire content of both of which is incorporated herein by reference.

FIELD OF THE TECHNOLOGY

The present disclosure relates to the field of network technologies and, in particular, to a message update method and apparatus, and a terminal thereof.

BACKGROUND OF THE DISCLOSURE

With development of network technologies, social applications are used to provide information services. A user not only can perform message interaction with a friend of the user one by one by using a social application, but also can perform, in a group, message interaction with another user in the group. Even though a user can automatically determine whether to join a group, the user may be uninterested in messages in some groups due to different attention degrees. In this case, a social application provides a manner of performing do-not-disturb setting on a group message. For example, the user may set a group in which the user is not interested to a muted group, so that the muted group does not remind the user in real time when receiving an updated message.

Even though the muted group does not perform reminding in real time, the message still needs to be updated. In a related technology, generally, when the user logs in, a message is pulled from the server, so as to update the message to a social application client. Alternatively, when the user clicks to remove a group message reminding identifier, a message is pulled from a server, so as to update the message to a social application client.

The two message update methods in the related technology both update all messages, but a large amount of traffic of the user is consumed during each update. However, because the updated messages are messages from some groups to which the user pays no attention, information value of the consumed traffic is low.

SUMMARY

To resolve a related technical problem, embodiments provide a message update method and apparatus, and a terminal. Technical solutions are as follows.

According to one aspect, a message update method is provided, the method including:

displaying a group message reminding identifier on a session entry of a specified group on a session list interface when it is detected that a message in the specified group is updated;

obtaining the updated message of the specified group from a server when it is detected that an operation on either of the group message reminding identifier and the specified group meets a message update condition; and displaying the number of updated messages of the specified group on the session entry when it is detected that the operation on either of the group message reminding identifier and the specified group does not meet the message update condition.

According to another aspect, a terminal is provided, the terminal including:

a processor; and a memory storing computer programs for the processor, wherein the processor is configured for:

displaying a group message reminding identifier on a session entry of a specified group on a session list interface when it is detected that a message in the specified group is updated;

obtaining the updated message of the specified group from a server when it is detected that an operation on either of the group message reminding identifier and the specified group meets a message update condition; and displaying the number of updated messages of the specified group on the session entry when it is detected that the operation on either of the group message reminding identifier and the specified group does not meet the message update condition.

According to another aspect, a computer readable storage medium is provided, the computer readable storage medium storing one or more programs, the one or more programs are used by one or more processors to perform a message update method, and method including:

displaying a group message reminding identifier on a session entry of a specified group on a session list interface when it is detected that a message in the specified group is updated;

obtaining the updated message of the specified group from a server when it is detected that an operation on either of the group message reminding identifier and the specified group meets a message update condition; and displaying the number of updated messages of the specified group on the session entry when it is detected that the operation on either of the group message reminding identifier and the specified group does not meet the message update condition.

The beneficial effects brought by the technical solutions provided in the embodiments are as follows:

When a message in a specified group is updated, analysis is performed according to an actual operation performed by a user on a group message reminding identifier or another operation performed by a user on the specified group, so as to determine whether to obtain the updated message from a server. Different update manners are used according to different operations performed by the user on the specified group, avoiding performing a message update process each time an updated message is detected. This greatly reduces a waste of terminal traffic, also avoids indiscriminate update of a group message to which the user pays no attention, and improves information value of consumed traffic.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following descriptions show merely some embodiments of the present invention, and a person of ordinary skill in the art may derive other drawings from these accompanying drawings without creative efforts.

DESCRIPTION OF EMBODIMENTS

To make the objectives, technical solutions, and advantages of the present disclosure clearer, the following further describes the implementation manners of the present disclosure in detail with reference to the accompanying drawings.

The embodiments of the present invention may be implemented based on an information service application. The information service application is installed in a terminal, such as a smartphone, a tablet computer, or the like, and may be a social application of any type, such as an instant communications application, a personal message display platform, or an application combining both. Herein, an implementation environment of the information service application is not specifically limited.

Figure 1:
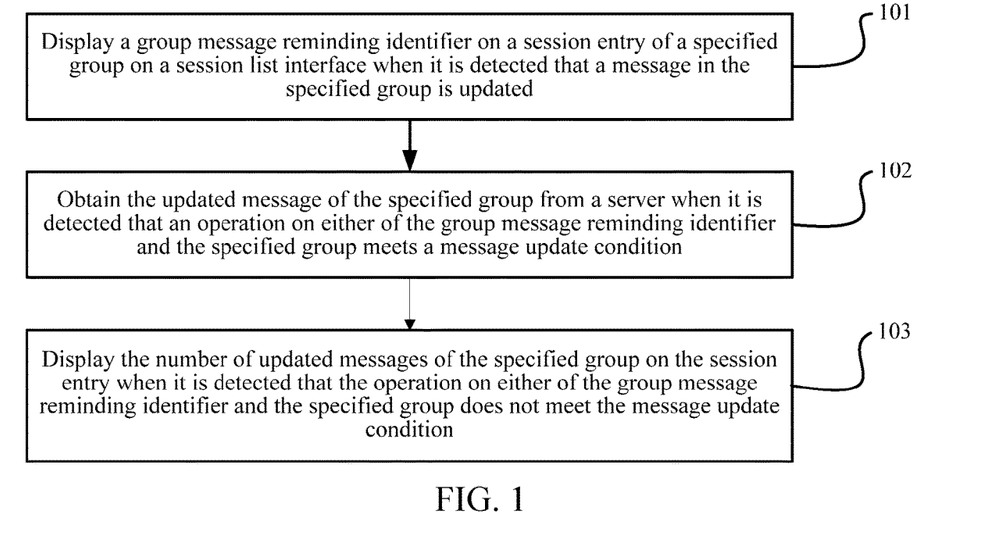
FIG. 1 is a flowchart of a message update method according to an embodiment of the present invention.

FIG. 1 is a flowchart of a message update method according to an embodiment of the present invention. Referring to FIG. 1, the method may include the following blocks/steps.

Block 101: Display a group message reminding identifier on a session entry of a specified group on a session list interface when it is detected that a message in the specified group is updated.

Block 102: Obtain the updated message of the specified group from a server when it is detected that an operation on either of the group message reminding identifier and the specified group meets a message update condition.

Block 103: Display the number of updated messages of the specified group on the session entry when it is detected that the operation on either of the group message reminding identifier and the specified group does not meet the message update condition.

In the method provided in this embodiment of the present invention, when a message in a specified group is updated, analysis is performed according to an actual operation performed by a user on a group message reminding identifier or another operation performed by a user on the specified group, so as to determine whether to obtain the updated message from a server. Different update manners are used according to different operations performed by the user on the specified group, avoiding performing a message update process each time an updated message is detected. This greatly reduces a waste of terminal traffic, also avoids indiscriminate update of a group message to which the user pays no attention, and improves information value of consumed traffic.

Optionally, the obtaining the updated message of the specified group from a server when it is detected that an operation on either of the group message reminding identifier and the specified group meets a message update condition includes:

obtaining the updated message of the specified group from the server when an operation of removing the group message reminding identifier is detected.

Optionally, the method further includes:

determining, when the operation of removing the group message reminding identifier is detected, whether a time interval between a start moment of displaying the group message reminding identifier and a moment at which the removal operation occurs is greater than a specified threshold; and if the time interval is greater than the specified threshold, performing the step of displaying the number of updated messages of the specified group on the session entry.

Optionally, the obtaining the updated message of the specified group from the server includes:

determining the number of updated messages according to historical duration during which a user stays on the specified group, and obtaining, from the server, updated messages conforming to the number of updated messages, where longer historical stay duration corresponds to the larger number of updated messages, and/or determining the number of updated messages according to a type of a terminal to which login is performed, and obtaining, from the server, updated messages conforming to the number of updated messages, where a stronger processing capability of the type of the terminal to which login is performed corresponds to the larger number of updated messages.

Optionally, the obtaining the updated message of the specified group from the server includes:

obtaining a message type of the updated message when it is detected that the message in the specified group is updated; and for an updated message whose message type is a specified type, obtaining the updated message of the specified type when an operation of viewing the updated message of the specified type is detected.

All the foregoing optional technical solutions may be arbitrarily combined to form embodiments of the present invention, and are not described herein one by one again.

Figure 2:
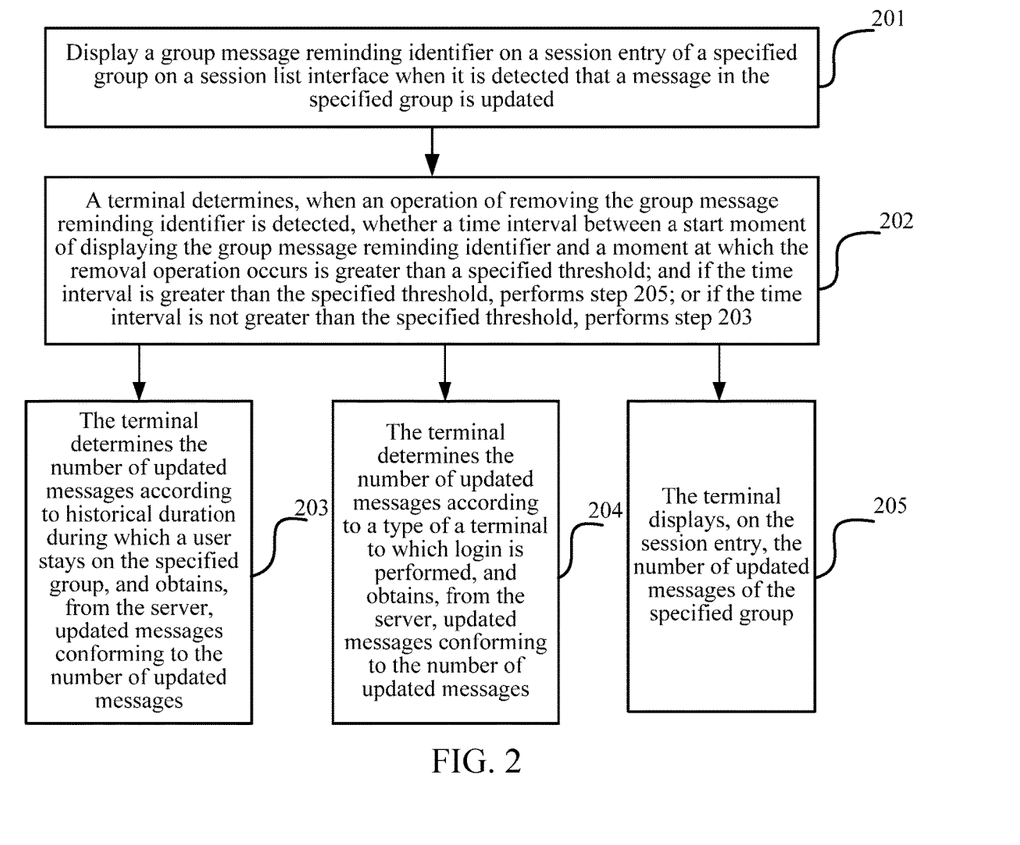
FIG. 2 is a flowchart of a message update method according to an embodiment of the present invention.

FIG. 2 is a flowchart of a message update method according to an embodiment of the present invention. Referring to FIG. 2, the method may include step blocks as follows.

Block 201: Display a group message reminding identifier on a session entry of a specified group on a session list interface when it is detected that a message in the specified group is updated.

In this embodiment, a specified group is a group that is already set to a muted group. The muted group may be automatically set by a user in a terminal using process according to a degree of interest in a message in the group. A process of setting the muted group is not specifically limited in this embodiment. For example, a user is not interested in a message in a group, and the user may set the group to a muted group based on a do-not-disturb function provided by a social application.

When a server determines that a message in a specified group is updated, for example, a user of a group releases a new message, the server may send, by using a push system, a message update event to a terminal at which another user in the group is located. After receiving the message update event, a current terminal may display a group message reminding identifier on a session entry of the specified group in a session list interface of the terminal. Certainly, when switching is performed on the terminal to the session list interface, the message update event may also be obtained by the terminal by means of querying in the server. When it is determined that the message in the specified group is updated, the terminal may display the group message reminding identifier on the session entry of the specified group on the session list interface of the terminal. Alternatively, the message update event may be obtained by the terminal by means of polling in a background server, so that when switching is performed on the terminal to a session displaying interface, the group message reminding identifier is displayed on the session entry of the specified group on the session list interface of the terminal.

The session list interface may be used to display each historical session interface of the user, a session reminding entry, and the like. The group message reminding identifier may be a highlighting identifier, such as a red point or a red identifier with the number of updated messages. The group message reminding identifier in this embodiment only needs to be specifically displayed on the session entry, and a specific display position on the session entry is not limited.

It should be noted that, in this embodiment, only the message update method of the specified group of the terminal is described, and for a group other than the specified group, that is, a group not set to a muted group, update may also be performed according to a message update method in a related technology, so as to ensure message update real-time quality. Certainly, if an update manner is set for another group that is not set to a muted group, the message update method in subsequent steps in this embodiment may also be performed, to avoid a waste of traffic. This is not specifically limited in this embodiment.

Block 202: The terminal determines, when an operation of removing the group message reminding identifier is detected, whether a time interval between a start moment of displaying the group message reminding identifier and a moment at which the removal operation occurs is greater than a specified threshold; and if the time interval is greater than the specified threshold, performs Block 205; or if the time interval is not greater than the specified threshold, performs Block 203.

The operation of removing the group message reminding identifier may be an operation of opening a dialog interface of a specified group, or may be an operation of clicking the group message reminding identifier. This is not specifically limited in this embodiment.

The start moment of displaying the group message reminding identifier may be a moment at which the group message reminding identifier appears on the session list interface. The moment at which the removal operation occurs is a moment at which the user removes the group message reminding identifier. The time interval between the two moments may be used to measure a degree of attention that is paid by the user to a specified group message. If the time interval is greater than the specified threshold, it may be considered that the user is not interested in a message updated in the specified group in real time, and is not anxious to view a message released by another user in the group. Therefore, in this case, an updated message may not be pulled. The specified threshold may be three days, five days, or the like. The specified threshold may be automatically set by a terminal user, so that the user actively selects a valuable message. In this case, cost performance of consumed traffic is high. For a valueless message, traffic of the user and server costs are no longer consumed. The specified threshold may be further set by a developer of a social application at which the specified group is located. Optionally, when the time interval is greater than the specified threshold, only the number of updated messages of the specified group may be displayed. Further, brief information of the last updated message may be further displayed while the number of updated messages is displayed. The brief information is, for example, a user identifier of a group in which a message is updated or preview content of the updated message. For example, the specified threshold is three days, and if the time interval is greater than 3 days, the step of obtaining the updated message is not performed.

When the time interval is less than or equal to the preset threshold, it may be considered that the user may be interested in a message in the specified group, and the updated message in the specified group may be obtained.

To enable the user to explicitly learn an obtaining condition, the terminal may provide prompt information, and the prompt information is used to notify the user that a muted group can receive a message only within the latest specified threshold time range.

In this embodiment, when the operation of removing the group message reminding identifier is detected, and the time interval between the start moment of displaying the group message reminding identifier and the moment at which the removal operation occurs is greater than the specified threshold, it may be determined that the terminal does not meet the message update condition. In this case, on the premise that the terminal does not obtain the updated message of the specified group from the server, Block 205 is performed. When the operation of removing the group message reminding identifier is detected, and the time interval between the start moment of displaying the group message reminding identifier and the moment at which the removal operation occurs is less than or equal to the specified threshold, it may be determined that the terminal meets the message update condition. In this case, Block 203 is performed to obtain the updated message of the specified group from the server.

The message update condition may be that the operation of removing the group message reminding identifier is detected, or may be that when the operation of removing the group message reminding identifier is detected, the time interval between the start moment of displaying the group message reminding identifier and the time at which the removal operation occurs is not greater than the specified threshold. The message update condition is not specifically limited in this embodiment.

Block 203: The terminal determines the number of updated messages according to historical duration during which a user stays on the specified group, and obtains, from the server, updated messages conforming to the number of updated messages.

For the specified group, the terminal may record duration during which the user stays on the specified group, and the stay time may be a time interval between a time when the user joins a group session and a time when the user leaves the group session. By recording the duration of staying on the specified group, historical duration during which the user stays on the specified group may be obtained through statistics collection. The historical stay duration may be an average value of stay duration of a plurality of processes in which the user stays on the specified group, or may be another statistics value that is recorded and determined according to a plurality of stays, such as a longest stay time, an average value of stay times in the latest time period, a stay time range, or access frequency. This is not specifically limited in this embodiment.

For a group, longer historical stay duration corresponds to the larger number of updated messages. When determining the number of updated messages, the terminal may allocated different numbers of updated messages according to different lengths of historical stay duration. For example, historical duration during which the user stays on a specified group A is very short, and stays within 1 second to 5 seconds each time, indicating that the user basically does not scrutinize a message released in A, and the number of updated messages that is corresponding to the A may be relatively small, and may be, for example, 10. Therefore, when obtaining an updated message from the server, the terminal may obtain only the latest 10 updated messages in the specified group A. If the historical duration during which the user stays on a specified group B is relatively long, it indicates that the user earnestly views a message released in B. Therefore, for completeness and validity of a message, the terminal may obtain relatively more updated messages from the server. For example, when obtaining update messages from the server, the latest 100 updated messages in the specified group B may be obtained.

Block 204: The terminal determines the number of updated messages according to a type of a terminal to which login is performed, and obtains, from the server, updated messages conforming to the number of updated messages.

For different types of terminals, for example, different brands, different machine types, and even different installation systems may cause different processing capabilities of the terminals. A message update process of a terminal having a relatively strong processing capability causes relatively less impact on normal running of another application, and also causes relatively less impact on running of the entire machine. Therefore, for the terminal having a relatively strong processing capability, the number of updated messages during each update may be set to be greater than that of a terminal having a relatively poor processing capability. That is, a stronger processing capability of a type of a terminal to which login is performed corresponds to the larger number of updated messages.

The terminal type may be maintained on a side of the terminal, so that the terminal type may be sent to the server in a process of obtaining the updated message. Therefore, the server determines, according to the terminal type, the number of messages needing to be updated, thereby avoiding impact on running of the terminal due to the excessively large number of updated messages.

It should be noted that when Block 202 is performed, and message update needs to be performed, message update may be performed according to the number of updated messages that is determined in Block 203 or 204 in this embodiment. Certainly, in another implementation manner of this embodiment, a relatively small value may be further selected, as the actual number of updated messages during update, from the numbers of updated messages determined in Blocks 203 and 204, so as to obtain, from the server, updated messages conforming to the actual number of updated messages. For example, the number of updated messages determined according to Block 203 is 10, and the number of updated messages determined according to Block 204 is 15, a relatively small value 10 may be selected from the two numbers as the actual number of updated messages. In this way, while real-time quality of the messages is ensured, the normal running of the terminal is also ensured, and a loading freeze phenomenon and the like are avoided. A manner or manners specifically used to determine the number of updated messages may be set by a user according to requirements of the user. This is not specifically limited in this embodiment.

To further avoid traffic consumption, in the process of obtaining an updated message from the server, a message type of the updated message may be further considered. For some message types consuming relatively large amount traffic, such as a small video or a video, when it is determined that the updated message has such a message type, the updated message of this type is not downloaded temporarily, but only a preview image and a resource address are downloaded. When it is determined that an operation of viewing the updated message by the user is detected, the updated message is downloaded based on the resource address. Specifically, the processor includes: obtaining a message type of an updated message; for an updated message whose message type is a specified type, obtaining the updated message of the specified type when an operation of viewing the updated message of the specified type is detected; and certainly, skipping obtaining the updated message of the specified type if no operation of viewing the updated message of the specified type is detected. The specified type may be audio, a video, a file whose size exceeds a preset value, and the like. This is not specifically limited in this embodiment.

Block 205: The terminal displays the number of updated messages of the specified group on the session entry.

In a related technology, once the user switches to the session list interface, a message is updated. However, in this embodiment, if the terminal detects that an operation on either of the group message reminding identifier and the specified group does not meet the message update condition, for example, the time interval between the start moment of displaying the group message reminding identifier and the moment at which the removal operation occurs is greater than the specified threshold, or the user performs no removal operation on the group message reminding identifier, the message is not obtained and it is flexible that only the number of updated messages on the specified group is displayed on the session entry.

It should be noted that, when a message in a specified group is updated in this embodiment, incremental update manner may be used, that is, a message that is already pulled by the terminal and that is locally stored in the terminal is not updated, and only the pulled message is updated. Using the incremental update manner may further avoid a traffic loss, and greatly improves use experience. The incremental update may be performed according to a message identifier. Specifically, an updated message identifier that is not locally stored in the terminal is determined according to the message identifier already locally stored in the terminal and an updated message identifier on a side of the server, and message update is performed according to the updated message identifier that is not locally stored in the terminal. For example, a user A has 40 updated messages in the specified group, message identifiers of the 40 updated messages are id1 to id40, and the number of messages updated each time is 10. After update is performed for the first time, the terminal already obtains id1 to id10 messages from the server and locally stores the messages. Assuming that the user A leaves the specified group and then returns to the specified group, the terminal may continue to obtain a message from the server. Because previously, the obtained 10 messages (id1 to id10) are already stored locally, during second update, the terminal may obtain 10 messages from the remaining 30 messages (id11 to id40), and locally store the 30 messages in the terminal.

It should be noted that, on the side of the server, each message has a value: update time update_time. After the terminal obtains a message once from the server, the terminal may record update_time of the first message. When a message is obtained from the server again, update_time may be used as the start time, and it is flexible that a message updated from the start time to the moment accessing the server is obtained.

In the method provided in this embodiment, when a message in a specified group is updated, analysis is performed according to an actual operation performed by a user on a group message reminding identifier or another operation performed by a user on the specified group, so as to determine whether to obtain the updated message from a server, avoiding performing a message update process each time an updated message is detected. This greatly reduces a waste of terminal traffic, also avoids indiscriminate update of a group message to which the user pays no attention, and improves information value of consumed traffic. Further, the update process is further limited according to the actual operation performed by the user on the specified group and the like, greatly reducing pointless traffic consumption, so that the update process better meets a degree of attention paid by the user to the specified group. Still further, the update number of the update process is further adjusted with reference to a processing capability of a terminal. In this way, normal running of the terminal is ensured, and a message update method that can automatically adapt to a machine type of the terminal is provided.

Figure 3:
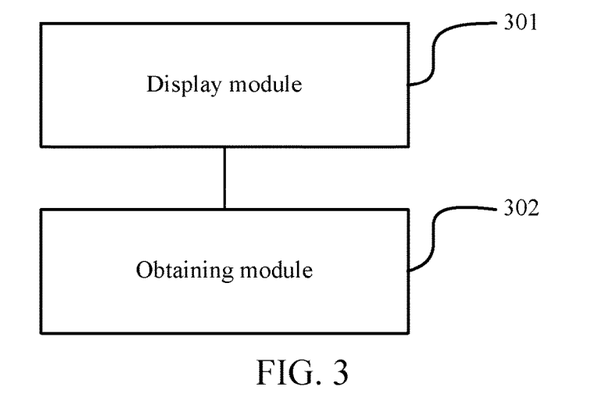
FIG. 3 is a schematic structural diagram of a message update apparatus according to an embodiment of the present invention.

FIG. 3 is a schematic structural diagram of a message update apparatus according to an embodiment. Referring to FIG. 3, the apparatus includes:

a display module 301, configured to display a group message reminding identifier on a session entry of a specified group on a session list interface when it is detected that a message in the specified group is updated; and an obtaining module 302, configured to obtain the updated message of the specified group from a server when it is detected that an operation on either of the group message reminding identifier and the specified group meets a message update condition, the display module 301 being further configured to display the number of updated messages of the specified group on the session entry when it is detected that the operation on either of the group message reminding identifier and the specified group does not meet the message update condition.

Optionally, the obtaining module 302 is configured to obtain the updated message of the specified group from the server when an operation of removing the group message reminding identifier is detected.

Optionally, the display module 301 is configured to: determine, when the operation of removing the group message reminding identifier is detected, whether a time interval between a start moment of displaying the group message reminding identifier and a moment at which the removal operation occurs is greater than a specified threshold; and if the time interval is greater than the specified threshold, display the number of updated messages of the specified group on the session entry.

Optionally, the obtaining module 302 is further configured to: determine the number of updated messages according to historical duration during which a user stays on the specified group, and obtain, from the server, updated messages conforming to the number of updated messages, where longer historical stay duration corresponds to the larger number of updated messages, and/or determine the number of updated messages according to a type of a terminal to which login is performed, and obtain, from the server, updated messages conforming to the number of updated messages, where a stronger processing capability of the type of the terminal to which login is performed corresponds to the larger number of updated messages.

Optionally, the obtaining module 302 is further configured to: obtain a message type of the updated message when it is detected that the message in the specified group is updated; and for an updated message whose message type is a specified type, obtain the updated message of the specified type when an operation of viewing the updated message of the specified type is detected.

It should be further noted that, in an actual application, the foregoing functions may be allocated to and completed by different function modules as required, that is, an internal structure of the device is divided into different function modules, to complete all or some of the functions described above. In addition, the message update apparatus and the message update method that are provided in the embodiments belong to a same concept. For specific implementation processes of the message update apparatus and the message update method, refer to the method embodiments, and details are not described herein again.

When a message in a specified group is updated, the apparatus provided in this embodiment performs analysis according to an actual operation performed by a user on a group message reminding identifier or another operation performed by a user on the specified group, so as to determine whether to obtain the updated message from a server. Different update manners are used according to different operations performed by the user on the specified group, avoiding performing a message update process each time an updated message is detected. This greatly reduces a waste of terminal traffic, also avoids indiscriminate update of a group message to which the user pays no attention, and improves information value of consumed traffic.

Figure 4:
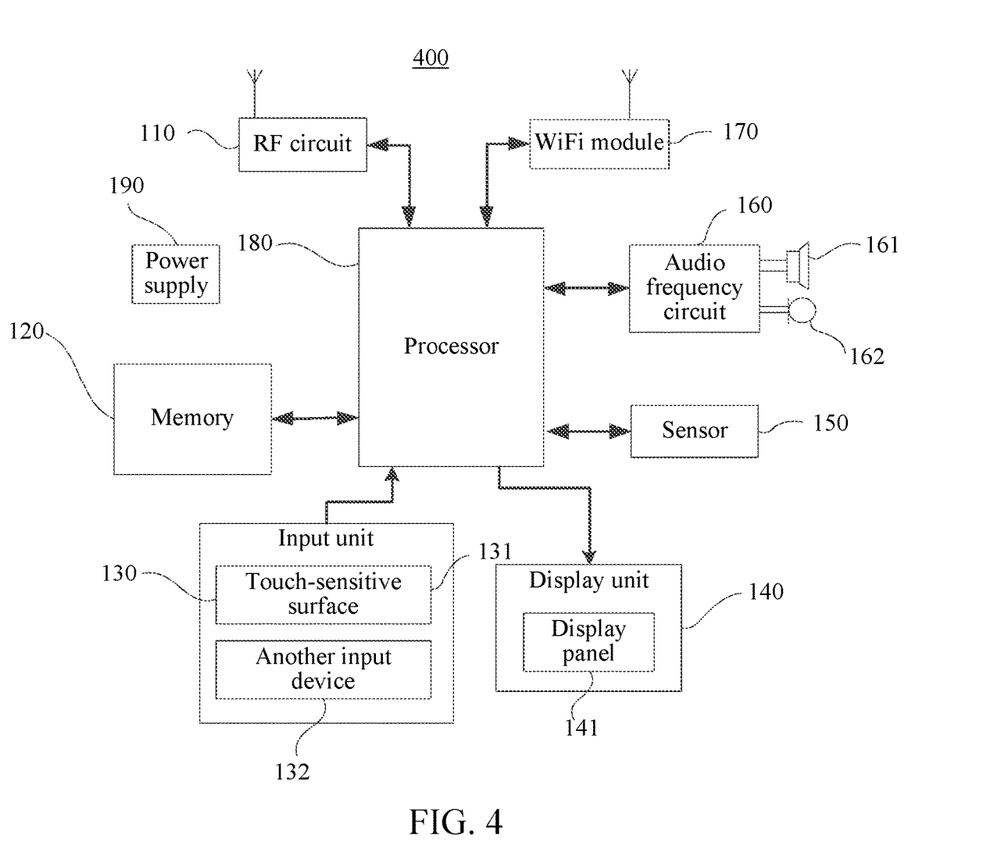
FIG. 4 is a schematic structural diagram of a terminal according to an embodiment of the present invention.

Another embodiment also provides a terminal. The terminal may be configured to perform the message update method provided in each of the foregoing embodiments. Referring to FIG. 4, a terminal 400 is provided.

The terminal 400 may include components, such as a radio frequency (RF) circuit 110, a memory 120 including one or more computer readable storage media, an input unit 130, a display unit 140, a sensor 150, an audio frequency circuit 160, a Wireless Fidelity (WiFi) module 170, a processor 180 including one or more processing cores, and a power supply 190. A person skilled in the art may understand that the terminal structure shown in FIG. 4 does not constitute any limitation to the terminal, and may include more components or fewer components than those shown in the figure, or some components may be combined, or a different component deployment may be used.

The RF circuit 110 may be configured to receive and send a signal during an information receiving and sending process or a conversation process. Specifically, after receiving downlink information from a base station, the RF circuit 110 delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by means of wireless communication. The wireless communication may use any communications standard or protocol, which includes, but is not limited to, a Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may configured to store a software program and a module, and the processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 400, and the like. In addition, the memory 120 may include a high speed random access memory, and may also include a non-volatile memory, such as at least one magnetic disk storage device, a flash memory, or another volatile solid storage device. Accordingly, the memory 120 may further include a memory controller, so that the processor 180 and the input unit 130 access the memory 120.

The input unit 130 may be configured to receive input digit or character information, and generate keyboard, mouse, joystick, optical, or track ball signal input related to the user setting and function control. Specifically, the input unit 130 may include a touch-sensitive surface 131 and another input device 132. The touch-sensitive surface 131 may also be referred to as a touch screen or a touch panel, and may collect a touch operation of a user on or near the touch-sensitive surface (such as an operation of a user on or near the touch-sensitive surface 131 by using any suitable object or attachment, such as a finger or a touch pen), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be implemented by using various types, such as a resistive type, a capacitance type, an infrared type, and a surface sound wave type. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 400. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine a type of a touch event. Then, the processor 180 provides corresponding visual output on the display panel 141 according to the type of the touch event. Although, in FIG. 4, the touch-sensitive surface 131 and the display panel 141 are used as two separate parts to implement input and output functions, in some embodiments, the touch-sensitive surface 131 and the display panel 141 may be integrated to implement the input and output functions.

The terminal 400 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 400 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone gesture (such as switchover between horizontal and vertical screens, a related game, and gesture calibration of a magnetometer), a related function of vibration identification (such as a pedometer and a knock). Other sensor, such as a gyroscope, a barometer, a hygrometer, a thermometer, and an infrared sensor, which may be configured in the terminal 400 are not further described herein.

The audio circuit 160, a loudspeaker 161, and a microphone 162 may provide audio interfaces between the user and the terminal 400. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 400.

WiFi belongs to a short distance wireless transmission technology. The terminal 400 may help, by using the wireless communications unit 170, a user to receive and send an e-mail, browse a webpage, and access stream media, and the like, which provides wireless broadband Internet access for the user. Although FIG. 4 shows the WiFi module 170, it may be understood that, the wireless communications unit does not belong to a necessary constitution of the terminal 400, and can be ignored according to demands without changing the scope of the essence of the present disclosure.

The processor 180 is a control center of the terminal 400, and connects to various parts of the terminal by using various interfaces and lines. By running or executing the software program and/or module stored in the memory 120, and invoking data stored in the memory 120, the processor 180 performs various functions and data processing of the terminal 400, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may also not be integrated into the processor 180.

The terminal 400 further includes the power supply 190 (such as a battery) for supplying power to the components. Preferably, the power supply may logically connect to the processor 180 by using a power supply management system, thereby implementing functions, such as charging, discharging, and power consumption management, by using the power supply management system. The power supply 190 may further include any component, such as one or more direct current or alternate current power supplies, a recharging system, a power supply fault detection circuit, a power supply converter or an inverter, and a power supply state indicator.

Although not shown in the figure, the terminal 400 may further include a camera, a Bluetooth module, and the like, which are not further described herein. Specifically, in this embodiment, the display unit of the terminal is a touch screen display, and the terminal further includes a memory and one or more programs. The one or more programs are stored in the memory and configured to be executed by one or more processors. The one or more programs include instructions used for performing the following operations: displaying a group message reminding identifier on a session entry of a specified group on a session list interface when it is detected that a message in the specified group is updated; obtaining the updated message of the specified group from a server when it is detected that an operation on either of the group message reminding identifier and the specified group meets a message update condition; and displaying the number of updated messages of the specified group on the session entry when it is detected that the operation on either of the group message reminding identifier and the specified group does not meet the message update condition.

The one or more programs further include instructions used for performing another operation in the message update method.

In an exemplary embodiment, a non-temporary computer readable storage medium including instructions is further provided, for example, a memory including instructions. The instructions may be executed by the processor of the terminal, to perform the message update method. For example, the non-temporary computer readable storage medium may be a ROM, a random access memory (RAM), a CD-ROM, a magnetic disk, a floppy disk, or an optical data storage device.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely embodiments of the present invention, but are not intended to limit the present disclosure. Any modification, equivalent replacement, or improvement made within the spirit and principle of the present disclosure shall fall within the protection scope of the present disclosure.

What is claimed is:

1. A message update method, comprising:
   displaying a group message reminding identifier on a session entry of a specified group on a session list interface when it is detected that a message in the specified group is updated;
   obtaining the updated message of the specified group from a server when it is detected that an operation on either of the group message reminding identifier and the specified group meets a message update condition; and
   displaying a number of updated messages of the specified group on the session entry when it is detected that the operation on either of the group message reminding identifier and the specified group does not meet the message update condition,
   wherein obtaining the updated message of the specified group from the server comprises:
   determining the number of updated messages according to historical duration during which a user stays on the specified group, and obtaining, from the server, updated messages conforming to the number of updated messages, wherein longer historical stay duration corresponds to the larger number of updated messages; and
   determining the number of updated messages according to a type of a terminal to which login is performed, and obtaining, from the server, updated messages conforming to the number of updated messages, wherein a stronger processing capability of the type of the terminal to which login is performed corresponds to the larger number of updated messages.

2. The method according to claim 1, wherein the obtaining the updated message of the specified group from a server when it is detected that an operation on either of the group message reminding identifier and the specified group meets a message update condition comprises:
   obtaining the updated message of the specified group from the server when an operation of removing the group message reminding identifier is detected.

3. The method according to claim 2, further comprises:
   determining, when the operation of removing the group message reminding identifier is detected, whether a time interval between a start moment of displaying the group message reminding identifier and a moment at which the removal operation occurs is greater than a specified threshold; and
   if the time interval is greater than the specified threshold, performing the step of displaying the number of updated messages of the specified group on the session entry.

4. The method according to claim 1, wherein the obtaining the updated message of the specified group from the server comprises:
   obtaining a message type of the updated message when it is detected that the message in the specified group is updated; and
   for an updated message whose message type is a specified type, obtaining the updated message of the specified type when an operation of viewing the updated message of the specified type is detected.

5. A terminal, comprising:
   a processor; and
   a memory storing computer programs for the processor, wherein the processor is configured for:
   displaying a group message reminding identifier on a session entry of a specified group on a session list interface when it is detected that a message in the specified group is updated;
   obtaining the updated message of the specified group from a server when it is detected that an operation on either of the group message reminding identifier and the specified group meets a message update condition; and
   displaying a number of updated messages of the specified group on the session entry when it is detected that the operation on either of the group message reminding identifier and the specified group does not meet the message update condition,
   wherein the processor is further configured for:
   determining the number of updated messages according to historical duration during which a user stays on the specified group, and obtaining, from the server, updated messages conforming to the number of updated messages, wherein longer historical stay duration corresponds to the larger number of updated messages; and determining the number of updated messages according to a type of a terminal to which login is performed, and obtaining, from the server, updated messages conforming to the number of updated messages, wherein a stronger processing capability of the type of the terminal to which login is performed corresponds to the larger number of updated messages.

6. The terminal according to claim 5, wherein the processor is further configured for:

obtaining the updated message of the specified group from the server when an operation of removing the group message reminding identifier is detected.

7. The terminal according to claim 5, wherein the processor is further configured for:

determining, when the operation of removing the group message reminding identifier is detected, whether a time interval between a start moment of displaying the group message reminding identifier and a moment at which the removal operation occurs is greater than a specified threshold; and if the time interval is greater than the specified threshold, performing the step of displaying the number of updated messages of the specified group on the session entry.

8. The terminal according to claim 5, wherein the processor is further configured for:

obtaining a message type of the updated message when it is detected that the message in the specified group is updated; and for an updated message whose message type is a specified type, obtaining the updated message of the specified type when an operation of viewing the updated message of the specified type is detected.

9. A non-transitory computer-readable storage medium, the computer readable storage medium storing one or more programs for, when executed by one or more processors, performing a message update method, and method comprising:

displaying a group message reminding identifier on a session entry of a specified group on a session list interface when it is detected that a message in the specified group is updated;

obtaining the updated message of the specified group from a server when it is detected that an operation on either of the group message reminding identifier and the specified group meets a message update condition; and displaying a number of updated messages of the specified group on the session entry when it is detected that the operation on either of the group message reminding identifier and the specified group does not meet the message update condition, wherein obtaining the updated message of the specified group from the server comprises:

determining the number of updated messages according to historical duration during which a user stays on the specified group, and obtaining, from the server, updated messages conforming to the number of updated messages, wherein longer historical stay duration corresponds to the larger number of updated messages; and determining the number of updated messages according to a type of a terminal to which login is performed, and obtaining, from the server, updated messages conforming to the number of updated messages, wherein a stronger processing capability of the type of the terminal to which login is performed corresponds to the larger number of updated messages.

10. The non-transitory computer-readable storage medium according to claim 9, wherein the obtaining the updated message of the specified group from a server when it is detected that an operation on either of the group message reminding identifier and the specified group meets a message update condition comprises:

obtaining the updated message of the specified group from the server when an operation of removing the group message reminding identifier is detected.

11. The non-transitory computer-readable storage medium according to claim 9, wherein the method further comprises:

determining, when the operation of removing the group message reminding identifier is detected, whether a time interval between a start moment of displaying the group message reminding identifier and a moment at which the removal operation occurs is greater than a specified threshold; and if the time interval is greater than the specified threshold, performing the step of displaying the number of updated messages of the specified group on the session entry.

12. The non-transitory computer-readable storage medium according to claim 9, wherein the obtaining the updated message of the specified group from the server comprises:

obtaining a message type of the updated message when it is detected that the message in the specified group is updated; and for an updated message whose message type is a specified type, obtaining the updated message of the specified type when an operation of viewing the updated message of the specified type is detected.

* * * * *